(12) United States Patent
Fukuda (10) Patent No.: US 8,856,703 B2
(45) Date of Patent: Oct. 7, 2014

(54) SUPPORTING DEVICE, DESIGN SUPPORT METHOD AND COMPUTER-READABLE RECORDING MEDIUM

(71) Applicant: Fujitsu Limited, Kawasaki (JP)

(72) Inventor: Daisuke Fukuda, Setagaya (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/778,240

(22) Filed: Feb. 27, 2013

(65) Prior Publication Data

US 2013/0232461 A1 Sep. 5, 2013

(30) Foreign Application Priority Data

Mar. 2, 2012 (JP) .................................. 2012-046079

(51) Int. Cl.
*G06F 17/50* (2006.01)
(52) U.S. Cl.
CPC ........ *G06F 17/5077* (2013.01); *G06F 2217/12* (2013.01)
USPC .............................. 716/110; 716/122; 716/126
(58) Field of Classification Search
CPC ............ G06F 17/5045; G06F 17/5068; G06F 17/5077; G06F 2217/12
USPC .................................. 716/110, 119, 122, 126
See application file for complete search history.

(56) References Cited

U.S. PATENT DOCUMENTS

2009/0113373 A1* 4/2009 Fukuda .......................... 716/13

FOREIGN PATENT DOCUMENTS

JP 2004-88102 3/2004
JP 2009-111244 5/2009

* cited by examiner

*Primary Examiner* — Paul Dinh
(74) *Attorney, Agent, or Firm* — Staas & Halsey LLP (57) ABSTRACT

A design supporting device includes a calculator that calculates an estimated value of a width, shifted by etching, of a wiring arranged in each of partial regions formed by dividing a layout region of a circuit to be designed on basis of a density of the wiring of the partial region, a length of a circumference of the wiring and a distance between the partial region and another partial region affecting the partial region, and uses the calculated estimated value to recalculate the density of the wiring of the partial regions, and a changer that changes the density of the wiring on basis of relationships between a recalculated density of the wiring and a preset threshold for the density.

6 Claims, 9 Drawing Sheets

| PARTIAL REGION ID | Dens | dummyDens | edgeLength | dummyArea | deltaWidth | Dens2 | edgeLegnth2 | Dummy change data | layer | x COORDINATE | y COORDINATE |
|---|---|---|---|---|---|---|---|---|---|---|---|
| A-1 | 42 | ⋮ | 1700 | ⋮ | ⋮ | ⋮ | ⋮ | ⋮ | ⋮ | ⋮ | ⋮ |
| A-2 | 28 | ⋮ | 1000 | ⋮ | ⋮ | ⋮ | ⋮ | ⋮ | ⋮ | ⋮ | ⋮ |
| A-3 | 68 | ⋮ | 3000 | ⋮ | ⋮ | ⋮ | ⋮ | ⋮ | ⋮ | ⋮ | ⋮ |
| ... | ... | ... | ... | ... | ... | ... | ... | ... | ... | ... | ... |
| A-i | 50 | ⋮ | 200 | ⋮ | ⋮ | ⋮ | ⋮ | ⋮ | ⋮ | ⋮ | ⋮ |
| ... | ... | ... | ... | ... | ... | ... | ... | ... | ... | ... | ... |
| A-n | 72 | ⋮ | 4200 | ⋮ | ⋮ | ⋮ | ⋮ | ⋮ | ⋮ | ⋮ | ⋮ |

SUPPORTING DEVICE, DESIGN SUPPORT METHOD AND COMPUTER-READABLE RECORDING MEDIUM

CROSS-REFERENCE TO RELATED APPLICATION

This application is based upon and claims the benefit of priority of the prior Japanese Patent Application No. 2012-046079, filed on Mar. 2, 2012, the entire contents of which are incorporated herein by reference.

FIELD

The embodiments discussed herein are related to a design supporting device, a design support method and a program.

BACKGROUND

In recent years, with reductions in the sizes of semiconductor devices and increases in the numbers of wiring layers of the semiconductor devices, the flatness of each of layers has been demanded. Specifically, it is important that copper-plated surfaces of substrates be polished by chemical mechanical polishing (CMP) or the like and thereby uniformly planarized in a wiring process included in a process of manufacturing semiconductor devices in order to improve the qualities of the semiconductor devices.

The densities and edge lengths (lengths of circumferences of wirings) of the wirings of partial regions in a whole semiconductor device vary depending on wiring patterns within the partial regions. For example, if a plurality of wirings with smaller widths than the length of one side of a partial region are formed in the partial region, the edge lengths of the wirings tend to be larger than wirings included in other partial regions. On the other hand, if wirings with larger widths than the length of one side of a partial region are formed in the partial region, the edge lengths of the wirings tend to be smaller than wirings included in other partial regions. It is known that if the edge lengths of wirings of partial regions after wiring vary, an irregularity of a polished surface of a substrate increases, and the increase in the irregularity may degrade performance of a semiconductor device. Thus, attempts to set the densities and edge lengths of wirings of partial regions to values in certain ranges and reduce irregularities of polished surfaces of substrates have been conducted.

Japanese Laid-open Patent Publications Nos. 2009-111244 and 2004-88102 are examples of related art.

In order to suppress the densities and edge lengths of wirings of partial regions to values in certain ranges, the following method is considered. The method is to limit the maximum value of the densities of the wirings of the partial regions and the maximum value of the edge lengths of the wirings of the partial regions, insert a dummy wiring in a partial region in which the density of a wiring is low after a layout of the wirings, and thereby limit the minimum value of the densities of the wirings of the partial regions and the minimum value of the edge lengths of the wirings of the partial regions.

In this method, if the heights and widths of the wirings vary due to etching, either the densities of the wirings or the edge lengths of the wirings, or both densities of the wirings and edge lengths of the wirings, may not be in ranges from the minimum values to the maximum values.

An object of an aspect of the embodiments is to reduce variations, caused by etching, in the heights and widths of wirings.

SUMMARY

According to an aspect of the embodiments, an apparatus includes a calculator that calculates an estimated value of a width, shifted by etching, of a wiring arranged in each of partial regions formed by dividing a layout region of a circuit to be designed on basis of a density of the wiring of the partial region, a length of a circumference of the wiring and a distance between the partial region and another partial region affecting the partial region, and uses the calculated estimated values to recalculate the density of the wiring of the partial regions, and a changer that changes the density of the wiring on basis of a relationship between a recalculated density of the wiring and a preset threshold for the density.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Hereinafter, design supporting devices according to embodiments are described in detail with reference to the accompanying drawings.

First Embodiment

Figure 1:
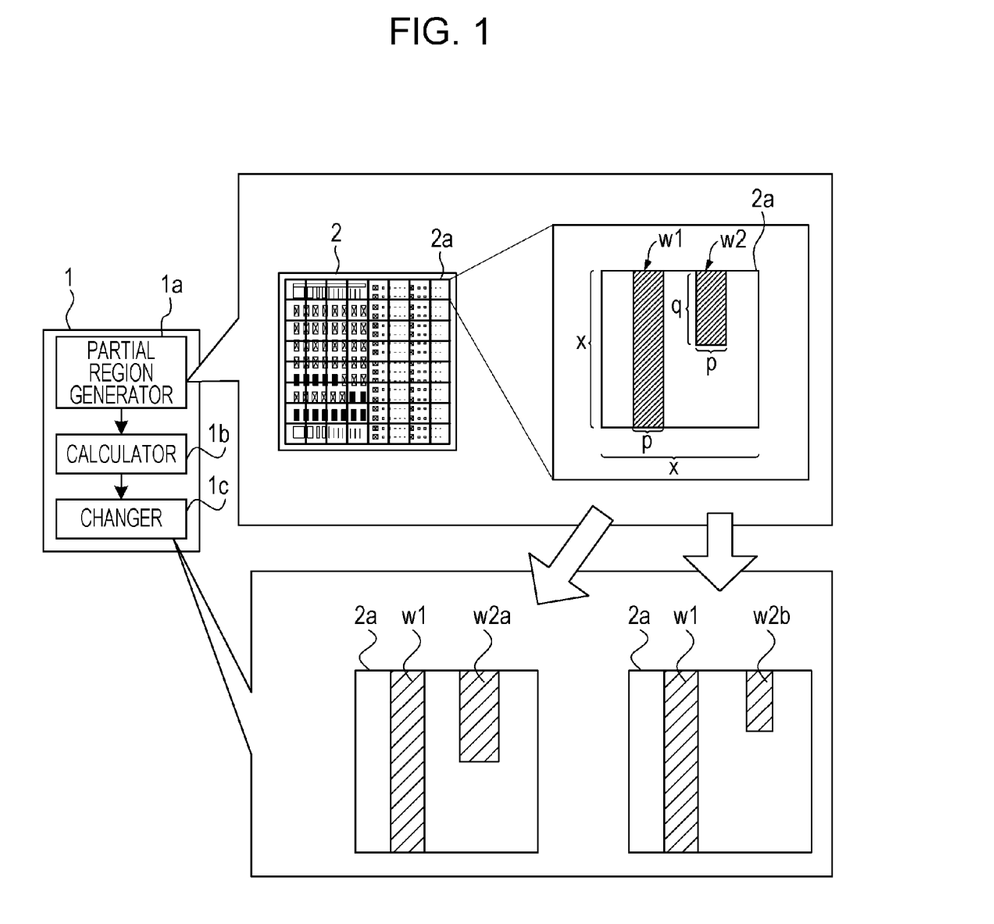
FIG. 1 is a diagram illustrating a design supporting device according to a first embodiment.

FIG. 1 is a diagram illustrating a design supporting device 1 according to the first embodiment.

The design supporting device (computer) 1 according to the first embodiment includes a partial region generator 1a, a calculator 1b and a changer 1c. The partial region generator 1a, the calculator 1b and the changer is can be achieved by functions of a central processing unit (CPU) included in the design supporting device 1.

The partial region generator is divides a layout region of a semiconductor integrated circuit 2 to be designed into a plurality of partial regions.

In FIG. 1, the semiconductor integrated circuit 2 is divided into a plurality of partial regions 2a that form a mesh pattern. The partial regions 2a are square regions that have sides with a length of x μm. In one of the partial regions 2a, an actual wiring w1 with a width of p μm and a dummy wiring w2 with a width of p μm are formed. The dummy wiring w2 is different from the actual wiring w1 and is a dummy metal wiring that is not related to transmission of an electric signal. The shape of the dummy wiring w2 can be set to an arbitrary shape. For example, the dummy wiring w2 is formed in a rectangle illustrated in FIG. 1, but may be formed in a triangle, a circle or the like. A method for inserting a dummy wiring is described in detail in the second embodiment.

An edge length (total length of circumferences of the wirings w1 and w2) of the partial region 2a is a value of (2x+p+2q) μm, which is obtained by summing an edge length (of 2x μm) of the actual wiring w1 and an edge length of ((p+2q) μm) of the dummy wiring w2.

The calculator 1b calculates, for each of the partial regions 2a, an estimated value of the width (variation in the width), shifted by etching, of a wiring arranged in the partial region 2a on the basis of the density and edge length of the wiring and distances between the interested partial region 2a and other partial regions 2a affecting the interested partial region 2a, and uses the calculated estimated values to recalculate the densities of the wirings in the partial regions 2a.

Specifically, the calculator 1b calculates an average width of a wiring arranged in each of the partial regions 2a from the areas of the partial regions 2a and the edge lengths and densities of the wirings arranged in the partial regions 2a. A specific equation to be used to calculate the average widths of the wirings is described in detail in the second embodiment. The calculator 1b uses the calculated average widths and the estimated values to recalculate the densities of the wirings in the partial regions 2a. By calculating the average widths of the wirings and using the calculated average widths of the wirings for the recalculation of the densities, the amount of data to be calculated can be reduced.

The changer 1c changes the density of a wiring in a partial region 2a on the basis of relationships between the densities, recalculated by the calculator 1b, of the wirings and a preset threshold for the densities. Specifically, if the difference between the density, recalculated by the calculator 1b, of a wiring in a partial region 2a and the threshold is larger than a predetermined value, the changer 1c increases the density of a dummy wiring in the partial region 2a. FIG. 1 illustrates a partial region 2a in which a dummy wiring w2a with a higher density than the dummy wiring w2 is arranged. If the difference between the density, recalculated by the calculator 1b, of the wiring and the threshold is smaller than the predetermined value, the changer 1c reduces the density of the dummy wiring in the partial region 2a. FIG. 1 illustrates a partial region 2a in which a dummy wiring w2b with a lower density than the dummy wiring w2 is arranged.

The calculator 1b recalculates the density of a wiring for each of partial regions 2a changed by the changer 1c, and the changer 1c executes the aforementioned process so as to change the density of a dummy wiring in each of the partial regions 2a. If there is no partial region 2a of which the density of a wiring is to be changed by the changer 1c, the design supporting device 1 terminates the process.

In the design supporting device 1, the calculator 1b calculates the widths, shifted by etching, of wirings and uses the calculated shifted widths to recalculate the densities of the wirings. Then, the changer 1c changes the density of a wiring on the basis of relationships between the recalculated densities of the wirings and the preset threshold for the densities. Thus, design data of the semiconductor integrated circuit 2, in which wirings that have densities and edge lengths designed in consideration of variations, caused by an etching process, in the widths of the wirings are arranged, can be obtained. The possibility that the densities and edge lengths of the wirings are not in ranges from the minimum values to the maximum values is suppressed. Variations in the heights and widths of the wirings within partial regions due to the etching can be reduced.

The densities of dummy wirings may be changed on the basis of the edge lengths of the wirings of the partial regions 2a. Specifically, the changer 1c may determine whether or not differences between the edge lengths of the partial regions 2a and a preset threshold for the edge lengths are equal to or larger than a predetermined value.

A design supporting device disclosed herein is described below in more detail in the second embodiment.

Second Embodiment

Figure 2:
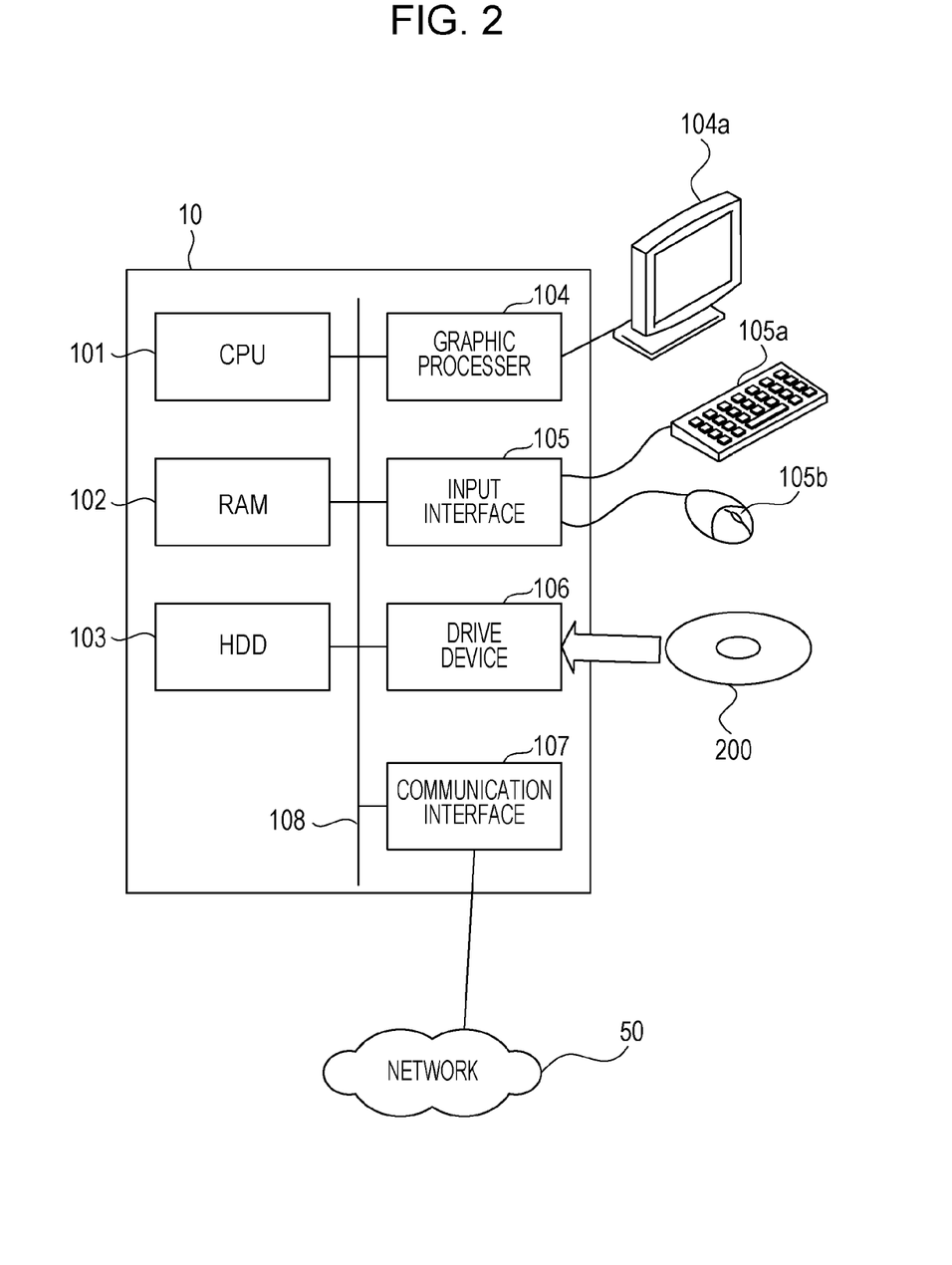
FIG. 2 is a diagram illustrating a hardware configuration of a design supporting device according to a second embodiment.

FIG. 2 is a diagram illustrating a hardware configuration of a design supporting device 10 according to the second embodiment.

The whole design supporting device 10 is controlled by a CPU 101. The CPU 101 is connected to a random access memory (RAM) 102 and a plurality of peripheral devices through a bus 108.

The RAM 102 is used as a main storage device of the design supporting device 10. At least a part of an operating system (OS) program to be executed by the CPU 101 and an application program to be executed by the CPU 101 is temporarily stored in the RAM 102. In addition, Data of various types that is used for a process to be executed by the CPU 101 is stored in the RAM 102.

A hard disk drive (HDD) 103, a graphic processor 104, an input interface 105, a drive device 106 and a communication interface 107 are connected to the bus 108.

The hard disk drive 103 magnetically writes and reads data in and from a disk included in the hard disk drive 103. The hard disk drive 103 is used as a secondary storage device of the design supporting device 10. The OS program, the application program and the data of the various types are stored in the hard disk drive 103. As the secondary storage device, a semiconductor storage device such as a flash memory may be used.

The graphic processor 104 is connected to a monitor 104a. The graphic processor 104 causes an image to be displayed on a screen of the monitor 104a in accordance with a command transmitted by the CPU 101. Examples of the monitor 104a are a display device provided with a cathode ray tube (CRT) and a liquid crystal display device.

The input interface 105 is connected to a keyboard 105a and a mouse 105b. The input interface 105 transfers signals transmitted by the keyboard 105a and the mouse 105b to the CPU 101. The mouse 105b is an example of a pointing device. Other pointing devices may be used instead of the mouse 105b. The other pointing devices are a touch panel, a tablet, a touch pad, a trackball and the like.

The drive device 106 reads data stored in a portable storage medium such as a universal serial bus (USB) memory or an optical disc storing the data that can be read by a reflection of light. For example, if the drive device 106 is an optical disc drive, the drive device 106 uses laser light or the like to read data stored in an optical disk 200. Examples of the optical disc 200 are a Blu-ray (registered trademark) disc, a digital versatile disk (DVD), a DVD-RAM, a compact disc read only memory (CD-ROM), a CD-recordable (R), a CD-rewritable (RW).

The communication interface 107 is connected to a network 50. The communication interface 107 transmits and receives data to and from another computer or a communication device through the network 50.

Processing functions according to the present embodiment can be achieved by the aforementioned hardware configuration.

The design supporting device 10 with the aforementioned hardware configuration as illustrated in FIG. 2 has the following functions.

Figure 3:
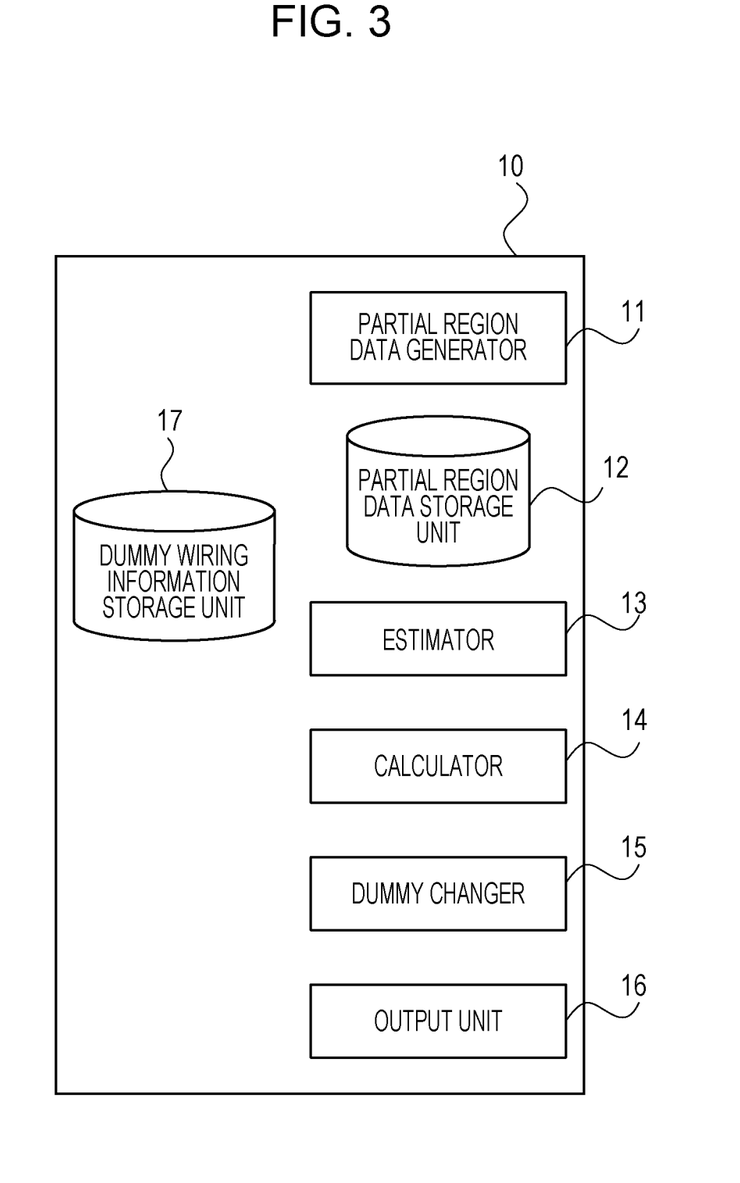
FIG. 3 is a block diagram illustrating functions of the design supporting device according to the second embodiment.

FIG. 3 is a block diagram illustrating the functions of the design supporting device 10 according to the second embodiment.

The design supporting device 10 includes a partial region data generator 11, a partial region data storage unit 12, an estimator 13, a calculator 14, a dummy changer 15, an output unit 16 and a dummy wiring information storage unit 17.

The partial region data generator 11 divides a layout region of a semiconductor integrated circuit into a plurality of partial regions on the basis of circuit data related to the semiconductor integrated circuit to be designed so as to cause the layout region to form a mesh pattern. Sides of the partial regions are in a range of 10 μm to 40 μm, for example. The circuit data is electronic data including a netlist and floor plan data. The circuit data may be obtained from an external device (not illustrated), obtained by a user's input operation or extracted from a database (not illustrated) or a library (not illustrated). The shapes, dimensions and the like of the partial regions to be obtained by dividing the layout may be arbitrarily set by a user's operation of the keyboard 105*a*, the mouse 105*b* or the like.

The partial region data generator 11 calculates the density (copper density) and edge length of an actual wiring for each of the partial regions. Specifically, the partial region data generator 11 can calculate the density and edge length of an actual wiring for each of the partial regions on the basis of layout data. The layout data is electronic binary data (such as GDSII data) to be used to describe a mask pattern. The density of an actual wiring in each of the partial regions is the ratio of the area of a surface of the wiring arranged in the partial region to the area of a surface of the partial region, for example. The edge lengths of the actual wirings are the lengths of circumferences of the actual wirings.

Next, the partial region data generator 11 inserts, on the basis of the calculated edge lengths, a dummy wiring in a partial region in which the density of an actual wiring is low. Information on the dummy wiring is stored in the dummy wiring information storage unit 17 that holds information of dummy wirings of multiple types.

An example of a method for inserting a dummy wiring is described below.

The partial region data generator 11 calculates the density and edge length of a dummy wiring to be inserted in a partial region. After that, the partial region data generator 11 extracts information of the dummy wiring corresponding to the calculated density and the calculated edge length from the dummy wiring information storage unit 17 and inserts the dummy wiring in an available region of the partial region.

Figure 4:
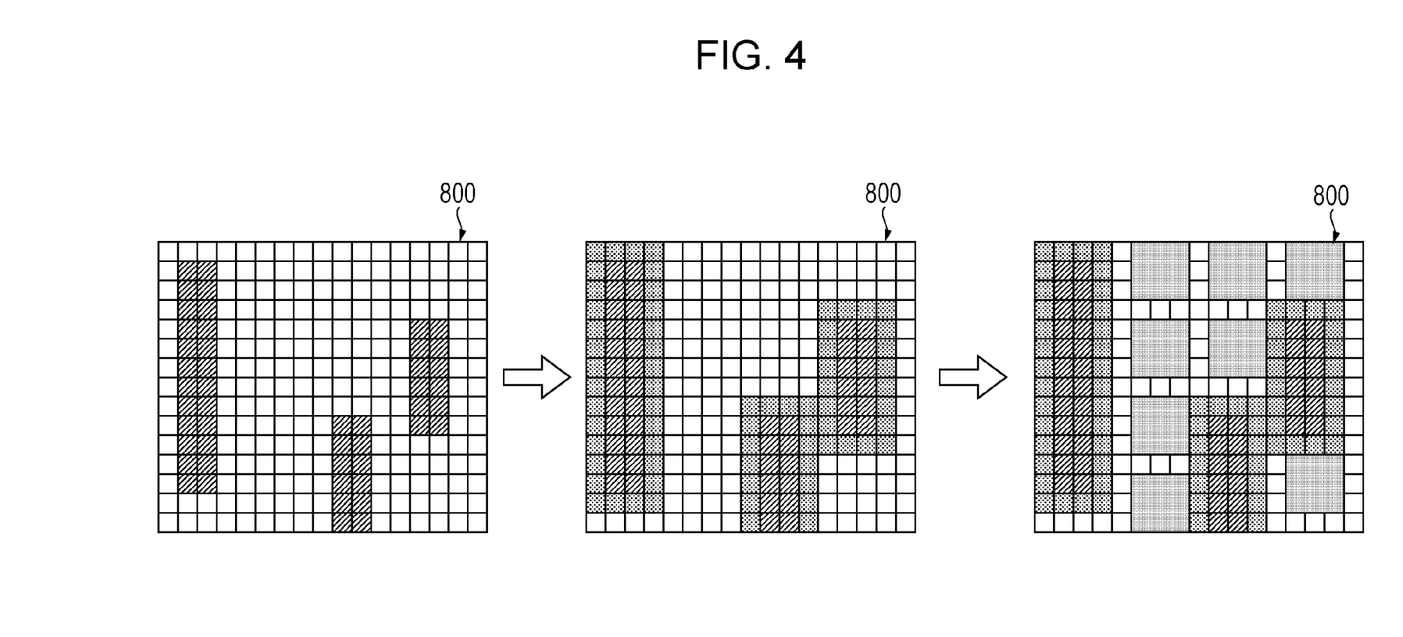
FIG. 4 is a diagram describing an example of a method for inserting a dummy wiring.

FIG. 4 is a diagram describing the example of the method for inserting a dummy wiring.

The partial region data generator 11 specifies the position of an actual wiring formed in a partial region 800 and fills the specified region. After that, the partial region data generator 11 specifies, in accordance with a design rule or the like, the position of a region located between the actual wiring and a dummy wiring and causing an interval between the actual wiring and the dummy wiring to be minimal, and fills the specified position. Then, the partial region data generator 11 specifies a region that is located in an available region excluding the filled regions and in which the dummy wiring is to be inserted. The partial region data generator 11 fills the specified region in which the dummy wiring is to be inserted.

In this case, the region in which the dummy wiring is to be inserted is specified so that dummy wirings do not overlap each other. Lastly, the partial region data generator 11 inserts the dummy wiring in the specified region of the partial region 800. Thus, the densities and edge lengths of the partial regions can be suppressed to certain values or smaller, and the flatness of a polished surface of a substrate can be improved to some extent.

Before the insertion of the dummy wiring, the partial region data generator 11 may determine whether or not the densities of the wirings of the partial regions are equal to or higher than a preset limit for the densities. If the density of a wiring of a partial region is equal to or higher than the limit, the partial region data generator 11 may not insert the dummy wiring in the partial region.

The partial region data generator 11 causes results of the calculations of the densities and edge lengths of the actual wirings of the partial regions, the density of the dummy wiring and the like to be stored in the partial region data storage unit 12.

Figure 5:
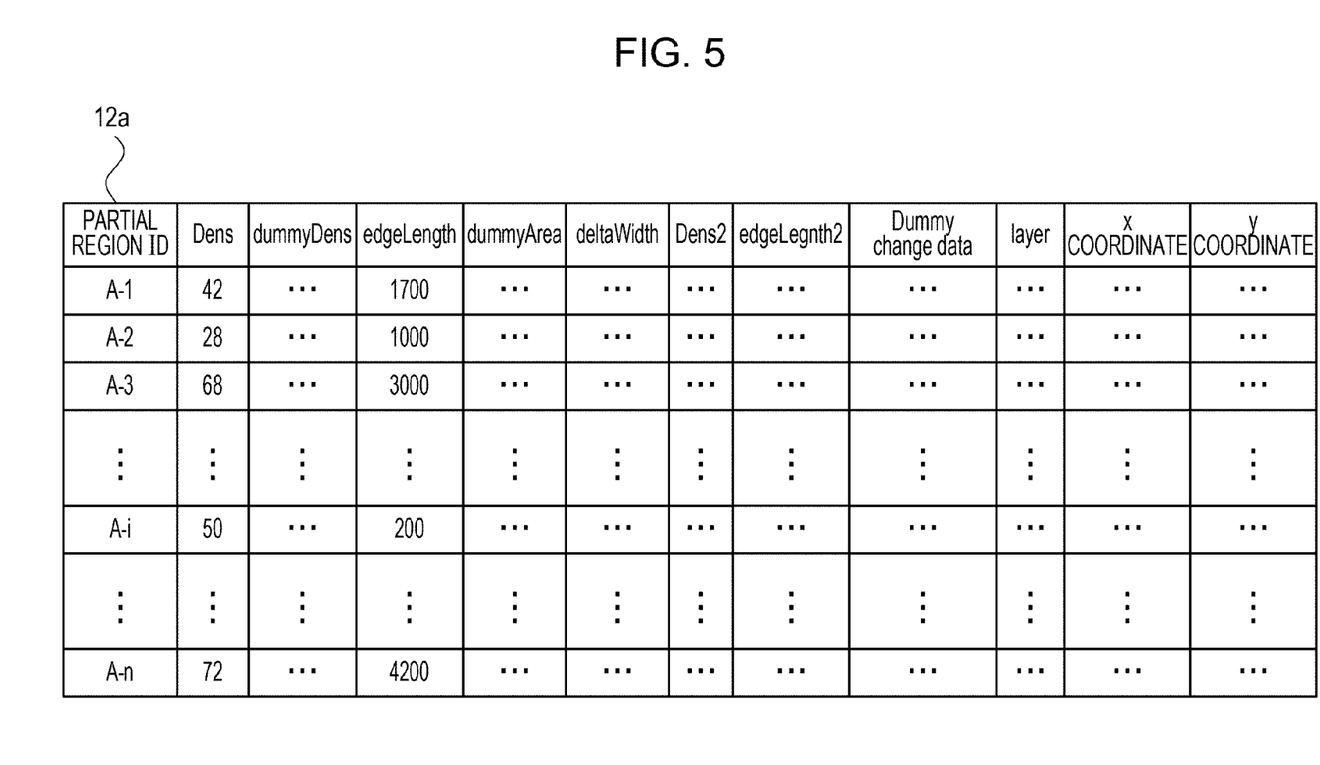
FIG. 5 is a diagram illustrating an example of data stored in a partial region data storage unit.

FIG. 5 is a diagram illustrating an example of the data stored in the partial region data storage unit 12.

FIG. 5 illustrates the example in which the layout region of the semiconductor integrated circuit is divided into a number n of partial regions.

In FIG. 5, a table 12*a* has fields for partial region IDs, Dens, dummyDens, edgeLength, dummyArea, deltaWidth, Dens2, edgeLength2, Dummy change data, layers, x coordinates and y coordinates. In the table 12*a*, information arranged in a horizontal direction is associated with each other. Among information indicated in the fields, information indicated in the fields for partial region IDs, Dens, dummyDens, edgeLength, dummyArea, Dummy change data, layers, x coordinates and y coordinates is data generated by the partial region data generator 11. Information indicated in the fields for deltaWidth, Dens2 and edgeLength2 is data generated by the estimator 13 and the calculator 14.

IDs that identify the partial regions are set in the field for partial region IDs.

Information that indicates the densities (%) of actual wirings and dummy wirings is set in the field for Dens.

Information that indicates the densities of dummy wirings is set in the field for dummyDens.

Information that indicates the edge lengths (μm) of the actual wirings and dummy wirings is set in the field for edgeLength.

Information that identifies the positions of the inserted dummy wirings is set in the field for dummyArea.

The widths (μm), shifted by etching of wirings, of the wirings are set in the field for deltaWidth. A method for calculating the shifted widths is described later.

Information that indicates the sums of copper densities of the actual wirings designed in consideration of the shifted widths and copper densities of the dummy wirings is set in the field for Dens2.

Information that indicates the sums of the edge lengths of the actual wirings designed in consideration of the shifted widths and the edge lengths of the dummy wirings is set in the field for edgeLength2.

Information that indicates a dummy wiring that is being used is set in the field for Dummy change data.

Numbers that identify layers of the semiconductor integrated circuit are set in the field for layers.

X coordinates of the interested partial regions are set in the field for x coordinates, while y coordinates of the interested partial regions are set in the field for y coordinates.

The estimator 13 calculates estimated values of the widths, shifted by etching, of the wirings arranged in the partial regions.

Figure 6:
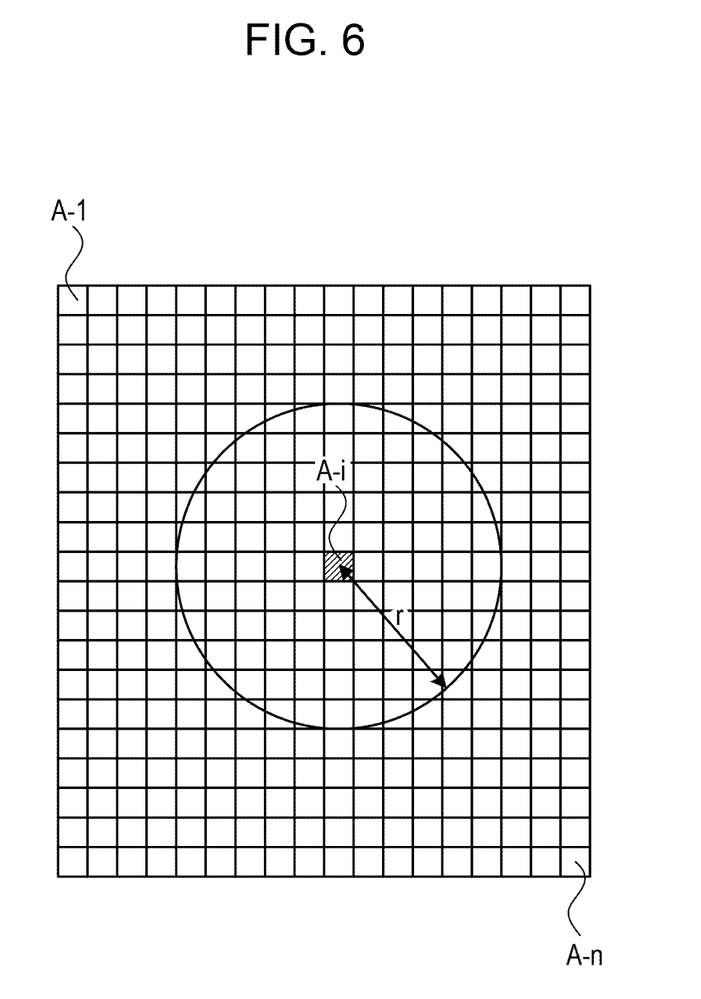
FIG. 6 is a diagram describing a process that is executed by an estimator.

FIG. 6 is a diagram describing a process that is executed by the estimator 13.

In FIG. 6, the partial region IDs match reference symbols. For example, a partial region with an ID "A-1" is represented by a partial region A-1.

The estimator 13 uses a partial region A-i to be processed, copper densities (d) and edge lengths (e) of all partial regions within distances affecting the partial region A-i and an estimation equation f (d, e, r) using a distance (r) from the center of the partial region A-i and thereby calculates an estimated value w (deltaWidth) of a shifted width of a wiring arranged in the partial region A-i. The estimation equation f may be the following Equation (1).

$$w = \Sigma(a_1 d^{b_1} + a_2 e^{b_2}) \qquad (1)$$

In Equation (1), symbols $a_1$, $a_2$, $b_1$ and $b_2$ are calibration parameters, and a symbol $\Sigma$ indicates partial regions that are separated from the center of the partial region A-i by distances that are equal to or smaller than the distance (r).

The estimator 13 calculates the estimated value w of the shifted width of the partial region A-i and causes the calculated estimated value w to be stored in the field for deltaWidth in the table 12a.

FIG. 6 illustrates the case where the estimated value w of the shifted width of the partial region A-i is calculated. The estimator 13, however, calculates estimated values w of shifted widths of the partial regions A-1 to A-n using Equation (1).

The estimator 13 adds the calculated estimated values w to the table 12a.

The calculator 14 recalculates the densities of the wirings of the partial regions on the basis of the estimated values w, calculated by the estimator 13, of the shifted widths. Specifically, the calculator 14 calculates, for each of the partial regions, the sum (Dens2) of a copper density of an actual wiring designed in consideration of the calculated estimated value w of the shifted width of the actual wiring and a copper density of a dummy wiring and the sum (edgeLength2) of an edge length of the actual wiring designed in consideration of the calculated estimated value w of the shifted width and an edge length of the dummy wiring.

Next, the calculator 14 uses the calculated sums Dens2 and the calculated sums edgeLength2 and thereby calculates degrees of risk. The degrees of risk are indexes that indicate risks that the densities and edge lengths of the wirings arranged in the partial regions are not in predetermined desired ranges. A method for calculating degrees of risk is described below.

The calculator 14 calculates an average width of an actual wiring arranged in each of the partial regions from the densities and edge lengths of the wirings of the partial regions described in the table 12a. The average width of the actual wiring arranged in the partial region can be calculated and equal to a value of (2×(the length of a side of the partial region)$^2$×Dens1/(the edge length of the actual wiring)). In this case, Dens1 can be calculated and equal to the density of an actual wiring arranged in each of the partial regions and is a value of (Dens−dummyDens).

Next, the calculator 14 changes the densities of an actual wiring and dummy wiring within each of the partial regions on the basis of the estimated values w of the shifted widths of the wirings. Each of the densities of the actual wirings after the change can be calculated and equal to a value of ((the original density)×((the average width)+(the estimated value w of the shifted width))/(the average width)). The densities of the dummy wirings after the change are calculated in advance.

The calculator 14 calculates the sums of the changed densities of the actual wirings and the changed densities of the dummy wirings and thereby calculates Dens2. In addition, the calculator 14 can calculates edgeLength2 in a similar manner to Dens2.

Next, the calculator 14 extracts differences between a set first threshold and the changed densities as first degrees of risk and extracts differences between a set second threshold and the changed edge lengths as second degrees of risk. The first and second thresholds may be set to arbitrary values by a designer. For example, if the first threshold is 20% and a changed density is 15.4%, a first degree of risk is 4.6.

Figure 7:
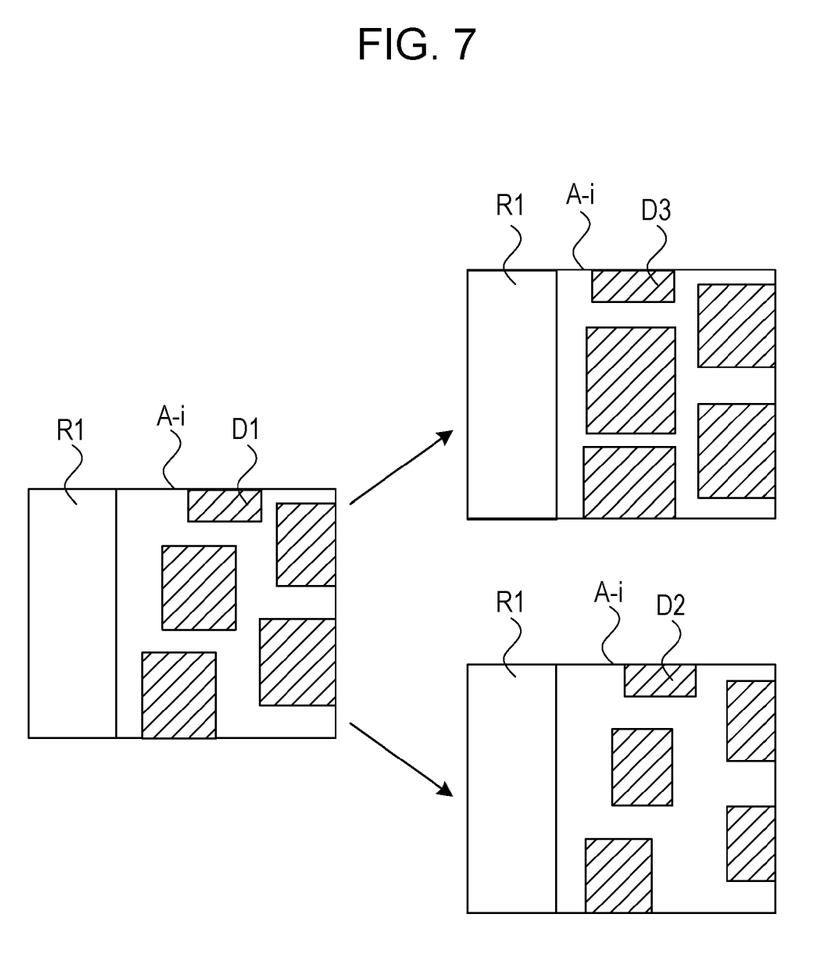
FIG. 7 is a diagram describing a process that is executed by a dummy changer.

FIG. 7 is a diagram describing a process that is executed by the dummy changer 15.

In the partial region A-i illustrated in FIG. 7, an actual wiring R1 and a plurality of dummy wirings D1 are arranged. In FIG. 7, rectangles indicated by hatched lines indicate the dummy wirings D1 arranged in the partial region A-i. The dummy changer 15 uses the first and second degrees calculated by the calculator 14 for each of the partial regions, and thereby determines whether to change the dummy wirings D1 inserted in the partial region A-i. Specifically, if either the first or second degree calculated for the partial region A-i is smaller than 1, the dummy changer 15 changes at least one of the dummy wirings D1 to a dummy wiring D2 with a lower density than the at least one of the dummy wirings D1. Thus, the sum of the density of the actual wiring R1 arranged in the partial region A-i and the densities of the dummy wirings D1 arranged in the partial region A-i is reduced. On the other hand, if either the first or second degree calculated for the partial region A-i is larger than 5, the dummy changer 15 changes at least one of the dummy wirings D1 to a dummy wiring D3 with a higher density than the at least one of the dummy wirings D1. Thus, the sum of the density of the actual wiring R1 arranged in the partial region A-i and the densities of the dummy wirings D1 arranged in the partial region A-i is increased. Note that the values (that are 1 and 5) that are reference values to be used to change at least one of the dummy wirings D1 are examples and may be set to arbitrary values by the designer.

The output unit 16 outputs data related to the partial region including the dummy wiring changed by the dummy changer 15 on the basis of the result of the determination. Specifically, the output unit 16 outputs layout data (GDSII data or the like) indicating that the dummy wiring has been inserted in an available region of the partial region A-i that was an insertion target region.

Next, a process that is executed by the design supporting device 10 is described using a flowchart.

Figure 8:
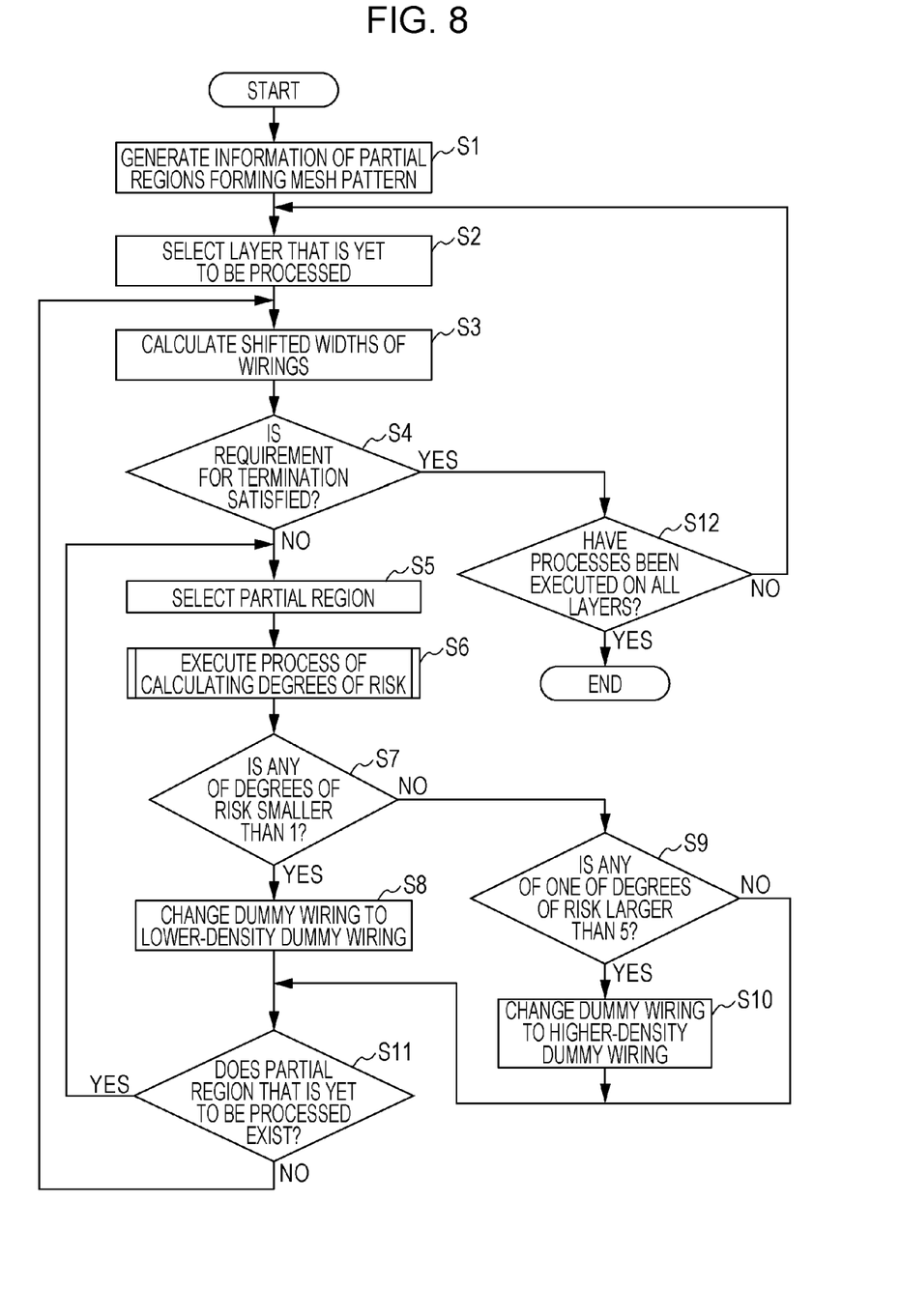
FIG. 8 is a flowchart of a process that is executed by the design supporting device.

FIG. 8 is the flowchart of the process that is executed by the design supporting device 10.

In operation S1, the partial region data generator 11 causes results of calculations of the density and edge length of an actual wiring arranged in each of partial regions of each of layers of a semiconductor integrated circuit to be examined and the density and the like of a dummy wiring to be stored in the partial region data storage unit 12. After that, the process proceeds to operation S2.

In operation S2, the estimator 13 selects a layer that is yet to be processed. After that, the process proceeds to operation S3.

In operation S3, the estimator 13 uses the estimation equation (1) to calculate estimated values w of the widths, shifted by etching, of the wirings. After that, the process proceeds to operation S4.

In operation S4, the calculator 14 determines whether or not a requirement for termination is satisfied. The requirement for the termination is at least one of the following requirements: a requirement (1) that the ratio of the number of partial regions that are among the partial regions A-1 to A-n and of which first and second degrees of risk are smaller than 1 or larger than 5 to the number of the partial regions A-1 to A-n is equal to or smaller than a predetermined value, a requirement (2) that a partial region that satisfies a requirement for operation S7 or S9 exists, all dummy wirings have been inserted and processes of operations S5 to S11 have been executed, a requirement (3) that processes of operation S3 to S11 have been repeatedly executed a predetermined number of times, and the like. If the requirement for the termination is satisfied (Yes in operation S4), the process proceeds to operation S12. If the requirement for the termination is not satisfied (No in operation S4), the process proceeds to operation S5.

In operation S5, the calculator 14 selects one of the partial regions. After that, the process proceeds to operation S6.

In operation S6, the calculator 14 executes the process of calculating first and second degrees of risk. After that, the process proceeds to operation S7. The process of calculating first and second degrees of risk is described later.

In operation S7, the calculator 14 determines whether or not either the first or second degree calculated in operation S6 is smaller than 1. If either the first and second degree of risk is smaller than 1 (Yes in operation S7), the process proceeds to operation S8. If both first and second degrees of risk are equal to or larger than 1 (No in operation S7), the process proceeds to operation S9.

In operation S8, the dummy changer 15 changes a dummy wiring of the interested partial region to a lower-density dummy wiring. After that, the process proceeds to operation S11.

In operation S9, the calculator 14 determines whether or not either the first and second degree calculated in operation S6 is larger than 5. If either the first and second degree of risk is larger than 5 (Yes in operation S9), the process proceeds to operation S10. If both first and second degrees of risk are equal to or smaller than 5 (No in operation S9), the process proceeds to operation S11.

In operation S10, the dummy changer 15 changes the dummy wiring of the interested partial region to a higher-density dummy wiring. After that, the process proceeds to operation S11.

In operation S11, the calculator 14 determines whether or not a partial region that is yet to be processed exists. If the partial region that is yet to be processed exists (Yes in operation S11), the process returns to operation S4. If the partial region that is yet to be processed does not exist (No in operation S11), the process returns to operation S2.

In operation S12, the calculator 14 determines whether or not the processes of operations S3 to S11 have been executed on all the layers of the semiconductor integrated circuit to be examined. If the processes of operations S3 to S11 have been executed on all the layers of the semiconductor integrated circuit to be examined (Yes in operation S12), the output unit 16 outputs information of partial regions including dummy wirings changed by the dummy changer 15 and identification data of the changed dummy wirings. After that, the process illustrated in FIG. 8 is terminated. If a layer on which the processes of operations S3 to S11 is yet to be completely executed exists (No in operation S12), the process returns to operation S2 and the layer that is yet to be processed is selected. Then, the processes of operations S3 and later are executed on the selected layer.

Next, the process of calculating first and second degrees of risk in operation S6 is described.

Figure 9:
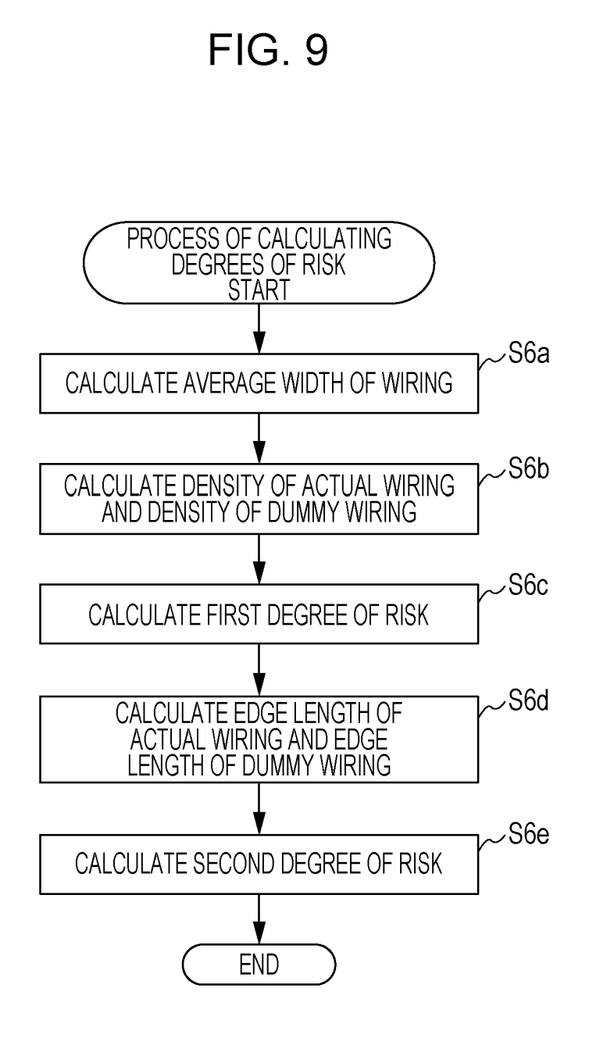
FIG. 9 is a flowchart of a process of calculating degrees of risk.

FIG. 9 is a flowchart of the process of calculating first and second degrees of risk.

In operation S6a, the calculator 14 calculates the average width of a wiring of the partial region selected in operation S5. After that, the process proceeds to operation S6b.

In operation S6b, the calculator 14 uses the average width calculated in operation S6a to calculate the density of the actual wiring of the partial region selected in operation S5 and the density of the dummy wiring of the partial region selected in operation S5. After that, the process proceeds to operation S6c.

In operation S6c, the calculator 14 calculates a first degree of risk. After that, the process proceeds to operation S6d.

In operation S6d, the calculator 14 uses the average width calculated in operation S6a to calculate the edge length of the actual wiring of the partial region selected in operation S5 and the edge length of the dummy wiring of the partial region selected in operation S5. After that, the process proceeds to operation S6e.

In operation S6e, the calculator 14 calculates a second degree of risk. After that, the process illustrated in FIG. 9 is terminated. The order of the processes of operation S6b to S6e is not limited to the order illustrated in FIG. 9.

As described above, the design supporting device 10 calculates estimated values w of the shifted widths of wirings using the estimation equation (1). Then, the design supporting device 10 changes the densities of actual and dummy wirings arranged in partial regions on the basis of the estimated values w of the shifted widths. The design supporting device 10 uses the distance r from each of the partial regions to calculate the estimated values w of the shifted widths and can thereby equalize the densities and edge lengths of the wirings arranged in the partial regions on the basis of an effect of a layout within a range that is separated by the distance r or less from the center of each of the partial regions. Thus, the possibility that the densities and edge lengths of the wirings are not in ranges from the minimum values to the maximum values is suppressed. Variations in the heights and widths of the wirings within the partial regions due to the etching can be reduced.

Since a dummy wiring is changed in some cases, an increase in the amount of the layout data output from the output unit 16 can be suppressed.

In addition, the design supporting device 10 calculates average widths of wirings and uses the calculated average widths to calculate the densities of dummy wirings and the densities of actual wirings in consideration of shifted widths. Thus, the amount of data to be calculated can be reduced, compared with the case where diagrams are sequentially calculated.

The processes that are executed by the design supporting device 10 may be separately executed by a plurality of devices. For example, while one device may calculate the estimated values w of the shifted widths, another device may use the estimated values w of the shifted widths to change a dummy wiring.

The design supporting device disclosed herein, the design support method disclosed herein and a program disclosed herein are described on the basis of the embodiments illustrated in the drawings, but are not limited to the embodiments. The configurations of the parts described above may be replaced with other arbitrary configurations that include the same functions as the parts described above. Other arbitrary constituent elements and processes may be added to the design supporting device disclosed herein, the design support method disclosed herein and the program disclosed herein.

Arbitrary two or more of the configurations (features) described in the embodiments may be combined.

The aforementioned processing functions can be achieved by a computer. In this case, a program that describes details of the processes to be executed by the functions included in the design supporting devices 1 and 10 is provided. The processing functions are achieved on the computer by causing the computer to execute the program. The program that describes the details of the processes may be stored in a computer-readable storage medium. Examples of the computer-readable storage medium are a magnetic storage device, an optical disc, a magneto-optical disk and a semiconductor memory. Examples of the magnetic storage device are a hard disk drive, a flexible disk (FD) and a magnetic tape. Examples of the optical disc are a DVD, a DVD-RAM, a CD-ROM and a CD-RW. An example of the magneto-optical disk is a magneto-optical (MO) disk.

In order to distribute the program, a portable storage medium that has stored therein the program and is a DVD, a CD-ROM or the like is sold. In addition, the program may be stored in a storage device of a server computer and transmitted from the server computer to another computer through a network.

The computer that executes the program stores, in a storage device included in the computer, the program stored in the portable storage medium or transmitted from the server computer. The computer reads the program from the storage device of the computer and executes the processes in accordance with the program. The computer may directly read the program from the portable storage medium and execute the processes in accordance with the program. The computer may execute the processes in accordance with the program every time the computer receives the program from the server computer connected to the computer through the network.

At least a part of the aforementioned processing functions may be achieved by an electronic circuit such as a digital signal processor (DSP), an application specific integrated circuit (ASIC) or a programmable logic device (PLD).

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A design supporting device comprising:
a calculator that calculates an estimated value of a width, shifted by etching, of a wiring arranged in each of partial regions formed by dividing a layout region of a circuit to be designed on basis of a density of the wiring of the partial region, a length of a circumference of the wiring and a distance between the partial region and another partial region, and uses the calculated estimated value to recalculate the density of the wiring of the partial region; and
a changer that changes the density of the wiring on basis of a relationship between the recalculated density of the wiring and a preset threshold for the density.

2. The design supporting device according to claim 1, wherein the changer changes the density of a dummy wiring within the partial region.

3. The design supporting device according to claim 1, wherein the calculator calculates an average width of a wiring within each of the partial regions from areas of the partial regions, the lengths of circumferences of the wirings within the partial regions and the densities of the wirings within the partial regions, and uses the calculated average widths and the estimated values to recalculate the densities of the wirings.

4. The design supporting device according to claim 1, wherein if the difference between the density of a wiring within a partial region and the threshold is larger than a predetermined value, the changer increases the density of the wiring within the partial region, and
wherein if the difference between the density and the threshold is smaller than the predetermined value, the changer reduces the density of the wiring within the partial region.

5. A method for design support, the method comprising:
calculating, executed by a computer, an estimated value of a width, shifted by etching, of a wiring arranged in each of partial regions formed by dividing a layout region of a circuit to be designed on basis of a density of the wiring of the partial region, a length of a circumference of the wiring and a distance between the partial region and another partial region;
using the calculated estimated value and thereby recalculate the density of the wiring of the partial region; and
changing the density of the wiring on basis of a relationship between the recalculated density of the wiring and a preset threshold for the density.

6. A non-transitory computer-readable recording medium having stored therein a program for causing a computer to execute a process, the process comprising:
calculating an estimated value of a width, shifted by etching, of a wiring arranged in each of partial regions formed by dividing a layout region of a circuit to be designed on basis of a density of the wiring of the partial region, a length of a circumference of the wiring and a distance between the partial region and another partial region;
using the calculated estimated value, recalculating the density of the wiring of the partial region; and
changing the density of the wiring on basis of relationships between the recalculated density of the wiring and a preset threshold for the density.

* * * * *

UNITED STATES PATENT AND TRADEMARK OFFICE
CERTIFICATE OF CORRECTION

PATENT NO. : 8,856,703 B2  
APPLICATION NO. : 13/778240  
DATED : October 7, 2014  
INVENTOR(S) : Daisuke Fukuda Page 1 of 1

It is certified that error appears in the above-identified patent and that said Letters Patent is hereby corrected as shown below:

On the Title Page, item (54), and in the Specification, Column 1, Line 1, the Title, Before "SUPPORTING" insert -- DESIGN --, therefor.

Signed and Sealed this  
Third Day of March, 2015

Michelle K. Lee  
*Deputy Director of the United States Patent and Trademark Office*